Figure 1:
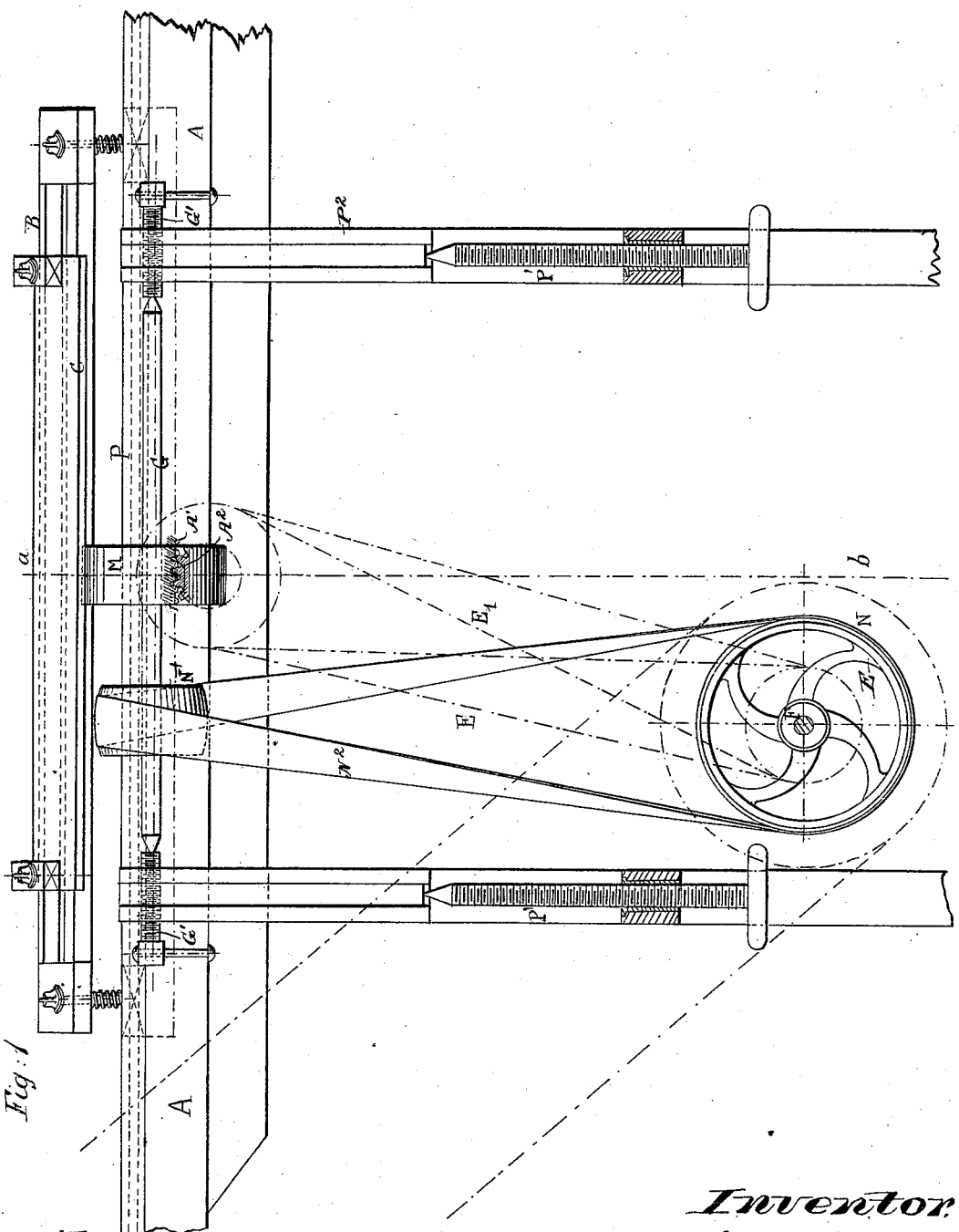

(No Model.) 3 Sheets—Sheet 1.
L. DE COSTER.
APPARATUS FOR CUTTING BEVELS, &c., ON GLASS.
No. 373,768. Patented Nov. 22, 1887.

Witnesses,
Dennis Sumby.
Robert Everett.

Inventor
Louis De Coster,
By James L. Norris.
Atty.

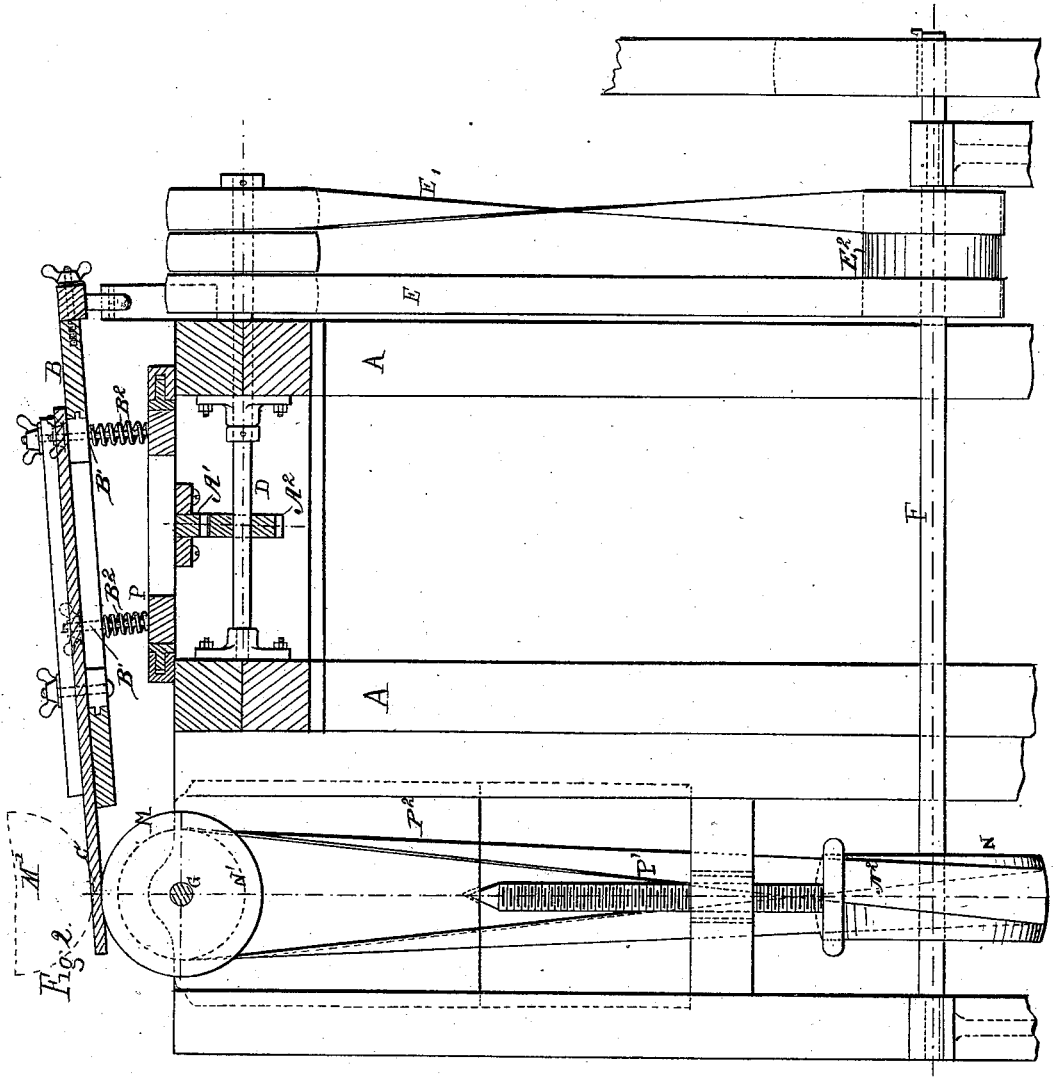

(No Model.) 3 Sheets—Sheet 3.
L. DE COSTER.
APPARATUS FOR CUTTING BEVELS, &c., ON GLASS.
No. 373,768. Patented Nov. 22, 1887.
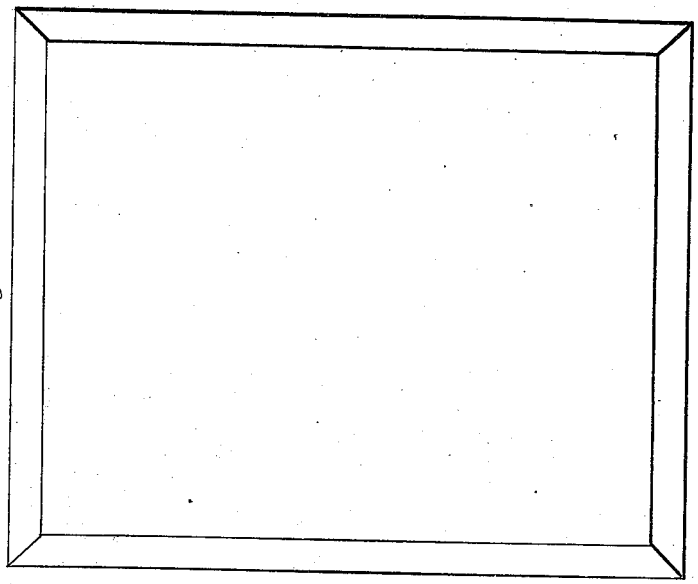
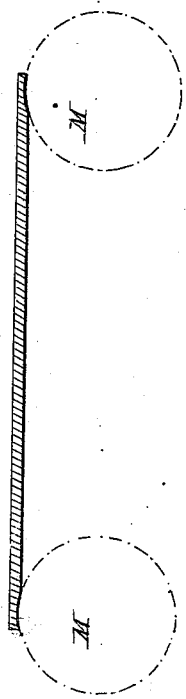
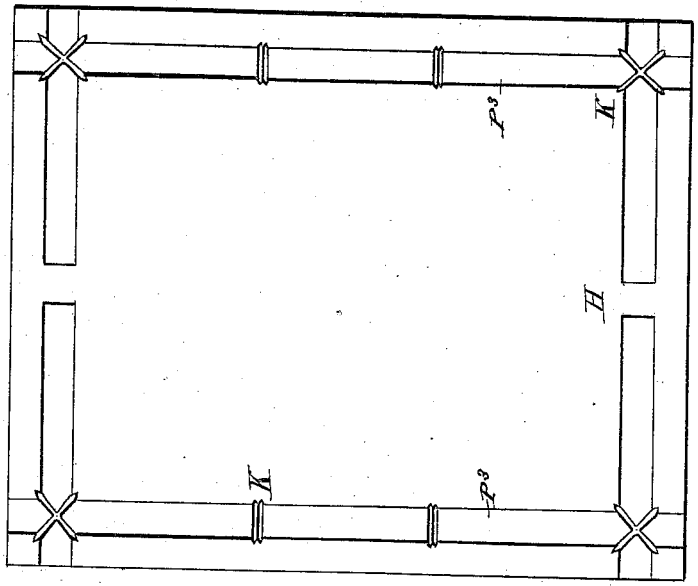
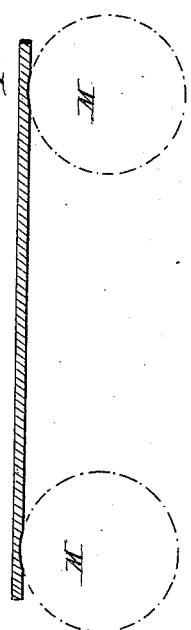
Witnesses.
Dennis Sumby
Robert Everett
Inventor.
Louis De Coster
By James L. Norris
Atty.

UNITED STATES PATENT OFFICE.

LOUIS DE COSTER, OF PARIS, FRANCE.

APPARATUS FOR CUTTING BEVELS, &c., ON GLASS.

SPECIFICATION forming part of Letters Patent No. 373,768, dated November 22, 1887.

Application filed October 7, 1885. Serial No. 179,232. (No model.) Patented in France May 14, 1885, No. 167,629.

*To all whom it may concern:*

Be it known that I, LOUIS DE COSTER, a citizen of France, residing at Paris, in the Republic of France, have invented a new and useful Apparatus for Cutting Bevels, Chamfers, or Hollowed Bands on Mirrors or other Glass Plates, (for which I have obtained a patent in France, dated May 14, 1885, No. 167,629,) of which the following is a specification.

Usually for beveling or chamfering mirrors or other glass plates a grinding-wheel is employed which revolves on an axis at right angles to the line of cut, which is therefore parallel to the plane of revolution.

My invention relates to apparatus for cutting bevels, chamfers, or hollow bands on mirrors or other glass plates by means of a grinding-wheel which revolves on an axis parallel to the line of cut, which is thus formed as a concave hollow of greater or less curvature, according to the size of grinding-wheel employed.

Figure 1 of the accompanying drawings is a side view, and Fig. 2 is an end view, partly in section, of the apparatus according to my invention. Fig. 3 is a front view, and Fig. 4 a section, illustrating a mirror or glass plate beveled at the edges. Fig. 5 is a front view, and Fig. 6 a section, illustrating a mirror or glass plate with hollowed bands cut within the margin.

A is a framing, on which is fitted a slide, P, which is moved longitudinally by a rack, A', on its under side gearing with a pinion, A², on a transverse spindle, D. On the slide P is mounted a frame, B, on which is clamped the glass plate C, that has to be cut. The frame B is secured to the slide P by bolts B' with interposed springs, so that it can be adjusted to greater or less obliquity. The spindle D is driven in either direction by a straight band, E, or cross-band E', connecting pulleys on shaft D with a broad pulley, E², on a main shaft, F, that can be driven from any convenient motor. On the same shaft F is a pulley, N, which, by means of a half-crossed band, N², drives a pulley, N', on a longitudinal spindle, G, on which is fixed the grinding-wheel M. The set-screws G', which form centers for the ends of the spindle G, pass through slides P², which can be raised or lowered by screws P' P', so as to adjust the depth of cut effected by the wheel M. Sometimes it is convenient to make the wheel M act on the upper side of the glass, as indicated by the dotted lines M', Fig. 2.

In cutting hollow bands, as illustrated by Figs. 5 and 6, they may be continuous, or by withdrawing for a time the grinding-wheel they can be interrupted, as indicated at H, at any desired parts of their length; and these or other parts of the bands may be ornamented by deeper cuts, as at K.

Having thus described the nature of my invention and the best way I know of carrying it out in practice, I claim—

1. In an apparatus for cutting bevels, chamfers, or hollowed bands on mirrors or other glass plates, the combination of a sliding table, P, the frame B, supported thereon for carrying the glass, screw-bolts connecting the table and frame, and springs interposed between the table and frame, whereby the glass is held in an elastic manner and can be adjusted to a more or less inclined position relatively to the grinding-wheel, substantially as herein described.

2. In apparatus for cutting bevels, chamfers, or hollowed bands on mirrors or other glass plates, the combination of the grinding-wheel M, rotating driving-shaft F, and band-pulleys N and N', sliding table P, traveling in direction of the axis of the grinding-wheel, a pinion on spindle D, shaft F, belts E E', frame B, holding the glass to be operated upon, screws connecting the said frame and sliding table, and interposed springs B², whereby the glass operated upon is automatically propelled in the direction of the axis of the grinding-wheel while it is being operated upon by the latter, substantially as herein described.

3. The combination of the vertical adjustable bearings P², screws P', for adjusting the same, the slide P, the frame B, carried by said slide, and the spindle G, provided with grinding-wheel M and supported by bearings P², the axis of said spindle G being parallel with the line of travel of slide P, substantially as and for the purposes described.

In testimony whereof I have signed my name to this specification, in the presence of two subscribing witnesses, this 24th day of September, A. D. 1885.

LOUIS DE COSTER.

Witnesses:
DIGEON JULES HENRI,
MOREL FERDINAND.